(12) United States Patent
An et al.

(10) Patent No.: US 11,728,501 B2
(45) Date of Patent: Aug. 15, 2023

(54) FUEL CELL, FUEL CELL MANUFACTURING METHOD, AND CATALYST ELECTRODE

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Ji Hwan An, Seoul (KR); Jeong Woo Shin, Seoul (KR); Sung Je Lee, Seoul (KR); Seong Kook Oh, Seoul (KR); Jin Geun Yu, Ansan-si (KR)

(73) Assignee: FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 258 days.

(21) Appl. No.: 16/875,309

(22) Filed: May 15, 2020

(65) Prior Publication Data
US 2020/0365925 A1    Nov. 19, 2020

(30) Foreign Application Priority Data
May 15, 2019 (KR) ......................... 10-2019-0057084

(51) Int. Cl.
*H01M 8/1213* (2016.01)
*H01M 8/1253* (2016.01)
(Continued)

(52) U.S. Cl.
CPC ....... *H01M 8/1213* (2013.01); *H01M 4/9025* (2013.01); *H01M 4/92* (2013.01);
(Continued)

(58) Field of Classification Search
CPC .... H01M 8/1213; H01M 4/9025; H01M 4/92; H01M 8/1253; H01M 4/8657;
(Continued)

(56) References Cited

U.S. PATENT DOCUMENTS

| 2003/0157386 A1* | 8/2003 | Gottmann | ........... H01M 8/0662 |
| | | | 429/465 |
| 2007/0212591 A1* | 9/2007 | Miyazaki | ................ H01M 4/90 |
| | | | 429/492 |

(Continued)

FOREIGN PATENT DOCUMENTS

| KR | 101331108 B1 | 11/2013 |
| KR | 1020130130776 A | 12/2013 |
| KR | 10-2017-0107345 | 9/2017 |

OTHER PUBLICATIONS

Seongkook Oh et al., "High performance low-temperature solid oxide fuel cells with atomic layer deposited-yttria stabilized zirconia embedded thin film electrolyte," Journal of Materials Chemistry A. The Royal Society of Chemistry. vol. 6, Feb. 6, 2018, pp. 7401-7408.

(Continued)

*Primary Examiner* — Ula C Ruddock
*Assistant Examiner* — Sarika Gupta
(74) *Attorney, Agent, or Firm* — Hamre, Schumann, Mueller & Larson, P.C.

(57) ABSTRACT

A fuel cell includes: an electrolyte layer; a base electrode formed on one side of the electrolyte layer; and a catalyst electrode formed on the other side of the electrolyte layer to be apart from the base electrode with the electrolyte layer interposed therebetween. The catalyst electrode includes: a first electrode portion that covers a part of the electrolyte layer; and a second electrode portion that covers a part of a (Continued)

surface of the first electrode portion to form an electrode portion interface in contact with the first electrode portion.

11 Claims, 8 Drawing Sheets

(51) Int. Cl.
    *H01M 4/90* (2006.01)
    *H01M 4/92* (2006.01)
    *H01M 4/86* (2006.01)

(52) U.S. Cl.
    CPC ........ *H01M 8/1253* (2013.01); *H01M 4/8657* (2013.01); *H01M 2300/0077* (2013.01)

(58) Field of Classification Search
    CPC ....... H01M 2300/0077; H01M 4/8867; H01M 2300/0074; H01M 8/126; H01M 4/8642; H01M 4/923; Y02P 70/50; Y02E 60/50
    See application file for complete search history.

(56) References Cited

U.S. PATENT DOCUMENTS

| | | | |
|---|---|---|---|
| 2011/0212386 A1* | 9/2011 | Roller | H01M 4/926 977/773 |
| 2017/0062799 A1* | 3/2017 | Song | H01M 4/8878 |

OTHER PUBLICATIONS

Jeong Woo Shin et al., "Atomic Layer Deposited CeO2Process to Low Temperature Solid Oxide Fuel Cell," Nov. 3, 2017, pp. 2871-2873.

* cited by examiner

FUEL CELL, FUEL CELL MANUFACTURING METHOD, AND CATALYST ELECTRODE

STATEMENT REGARDING THIRD PARTY RESEARCH PROJECT

The invention was made with Korean government support under Project No. 1415158661 with 33.3% contribution sponsored by the Ministry of Trade, Industry and Energy under Research Project Title: "Development of 2D material selective composite surface activation technology and plasma atomic layer thin film deposition process technology for manufacturing high performance and large area electronic device". This research period runs from Jul. 1, 2018, through Dec. 31, 2022. The beneficiary of said sponsorship is Foundation for Research and Business, Seoul National University of Science and Technology.

The invention was made with Korean government support under Project No. 1415174662 with 33.3% contribution sponsored by the Ministry of Trade, Industry and Energy under Research Project Title: "Development of cell stack of thin film-based solid oxide fuel cell for 500° C. operation". This research period runs from May 1, 2021, through Apr. 30, 2025. The beneficiary of said sponsorship is Korea Institute of Science and Technology.

The invention was made with Korean government support under Project No. 1345333873 with 33.3% contribution sponsored by the Ministry of education under Research Project Title: "Development of Establishment of scientific research foundation for science and engineering". This research period runs from Jun. 1, 2021, through May 31, 2030. The beneficiary of said sponsorship is Foundation for Research and Business, Seoul National University of Science and Technology.

TECHNICAL FIELD

The present disclosure relates to a fuel cell, a fuel cell manufacturing method, and a catalyst electrode.

BACKGROUND

A fuel cell is a power generation cell that generates electric power by an electrochemical reaction between hydrogen and oxygen. The fuel cell can continuously produce electricity without a need to recharge as long as hydrogen and oxygen (or air) are supplied from the outside.

The fuel cell has high energy conversion efficiency and does not generate greenhouse gases. Today, it is attracting attention as a next-generation energy source.

Meanwhile, to enhance the performance of the fuel cell, a catalyst capable of speeding up the electrochemical reaction in an electrode is needed. Particularly, the electrochemical reaction in an air electrode is slow. Therefore, a high-performance catalyst electrode capable of activating the electrochemical reaction even at a low temperature needs to be used.

In recent years, a platinum-carbon (Pt—C) polymer has been widely used due to high catalytic activity of platinum and has been prepared mainly by a wet process or an E-beam process. Also, conventional technologies relating to the composition of materials forming a catalyst layer have been disclosed as in Patent Document 1.

However, the above-described processes cost a lot of money due to high price of platinum for its performance, which results in an increase in the overall price of a fuel cell system and makes it difficult to mass-produce fuel cells.

Further, if a catalyst is maintained at a temperature higher than room temperature for a long time, the structure of the catalyst may be deformed and eliminated, which results in performance degradation.

Furthermore, in a method of altering the composition of materials forming a catalyst layer as described in Patent Document 1, a process for forming a catalyst layer needs to be newly designed and the equipment needs to be replaced.

PRIOR ART DOCUMENT (Patent Document 1) Korean Patent Laid-open Publication No. 10-2013-0130776 A (published on Dec. 2, 2013)

SUMMARY

In view of the foregoing, the present disclosure provides a fuel cell, a fuel cell manufacturing method, and a catalyst electrode, and in the fuel cell, platinum covers a part of an electrolyte layer on both sides of which different electrodes are formed and a cerium oxide in contact with the platinum covers a part of the surface of the platinum, and, thus, the cerium oxide promotes the adsorption of oxygen molecules and the oxygen molecules promote the diffusion of dissociated O adatoms. Therefore, the fuel cell can exhibit high activity with a small amount of platinum.

However, the problems to be solved by the present disclosure are not limited to the above-described problems. There may be other problems to be solved by the present disclosure.

An embodiment of the present invention relates to a fuel cell, the fuel cell comprising: an electrolyte layer; a base electrode formed on one side of the electrolyte layer; and a catalyst electrode formed on the other side of the electrolyte layer to be apart from the base electrode with the electrolyte layer interposed therebetween, wherein the catalyst electrode includes: a first electrode portion that covers a part of the electrolyte layer; and a second electrode portion that covers a part of a surface of the first electrode portion to form an electrode portion interface in contact with the first electrode portion.

Another embodiment of the present invention relates to a fuel cell manufacturing method, the fuel cell manufacturing method comprising: forming a base electrode and an electrolyte layer; and forming a catalyst electrode on the electrolyte layer to be apart from the base electrode with the electrolyte layer interposed therebetween, wherein the forming of the catalyst layer includes: forming a first electrode portion to cover a part of the electrolyte layer; and forming a second electrode portion that covers a part of a surface of the first electrode portion to form an electrode portion interface in contact with the first electrode portion.

Another embodiment of the present invention relates to a catalyst electrode formed on a supporting member to promote an electrochemical reaction, the catalyst electrode comprising: a first electrode portion that covers a part of the supporting member; and a second electrode portion that covers a part of a surface of the first electrode portion to form an electrode portion interface in contact with the first electrode portion.

The above embodiments are exemplary and should not be construed as limiting the present invention. In addition to the exemplary embodiments described above, there may be additional embodiments described in the drawings and detailed description of the invention.

According to any one of the embodiments of the present disclosure, it is possible to provide a fuel cell, a fuel cell manufacturing method, and a catalyst electrode, and in the fuel cell, platinum covers a part of an electrolyte layer on both sides of which different electrodes are formed and a cerium oxide in contact with the platinum covers a part of the surface of the platinum to form an electrode portion interface, and, thus, the cerium oxide promotes the adsorption of oxygen molecules and the oxygen molecules promote the diffusion of dissociated O adatoms. Therefore, the fuel cell can exhibit high activity with a small amount of platinum.

Also, according to the present disclosure, it is possible to provide a fuel cell, a fuel cell manufacturing method, and a catalyst electrode, and in the fuel cell, a cerium oxide is deposited by atomic layer deposition on the surface of platinum to increase the bond strength between the platinum and the cerium oxide, and, thus, the stability of a catalytic reaction at a high temperature can be improved.

DETAILED DESCRIPTION

Figure 1:
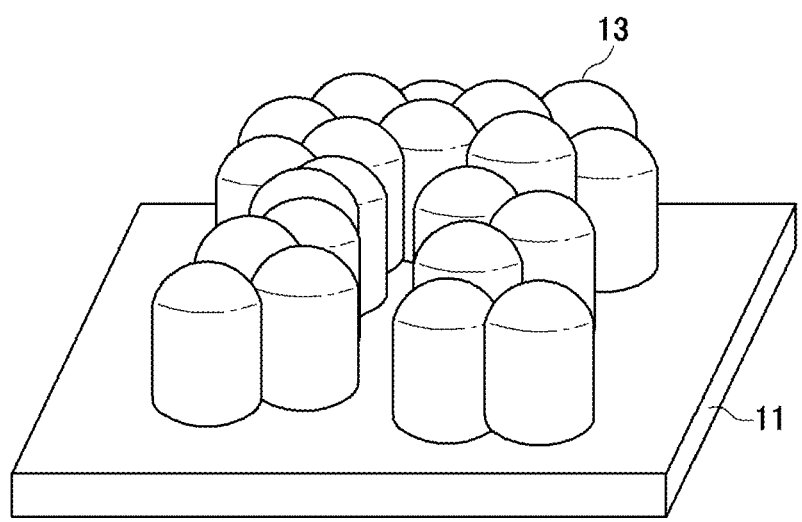
FIG. 1 illustrates a conventional catalyst electrode.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. Also, through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, through the whole document, the term "on" that is used to designate a position of one element with respect to another element includes both a case that the one element is adjacent to the another element and a case that any other element exists between these two elements.

Hereinafter, embodiments of the present disclosure will be described in detail with reference to the accompanying configuration views or flowchart.

First, a conventional fuel cell will be described with reference to FIG. 1.

FIG. 1 illustrates a conventional catalyst electrode.

Referring to FIG. 1, a conventional catalyst electrode 10 includes a platinum-carbon (Pt—C) polymer to take advantage of high catalytic activity of Pt. That is, as illustrated in FIG. 1, the conventional catalyst electrode 10 may be formed by forming Pt—C polymers 13 on one side of a supporting member 11.

Hereinafter, a fuel cell and a catalyst electrode according to an embodiment of the present disclosure will be described with reference to FIG. 2, FIG. 3A and FIG. 3B.

Figure 2:
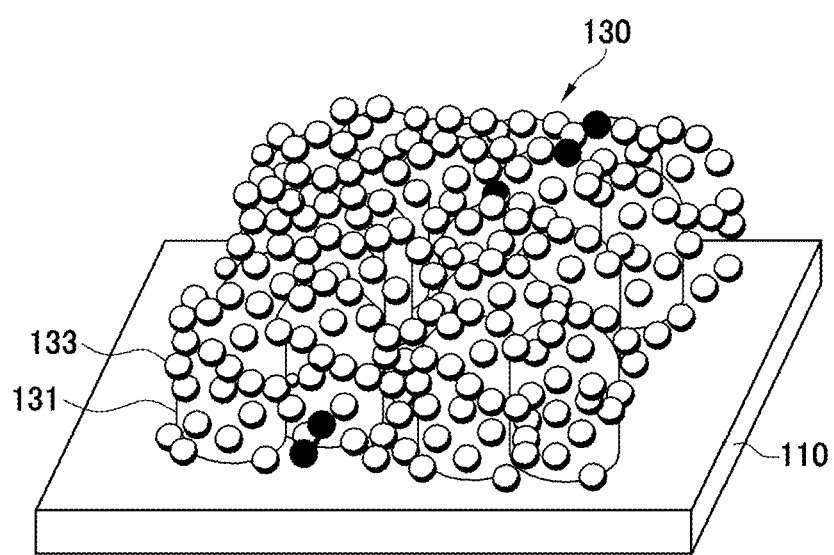
FIG. 2 illustrates a catalyst electrode forming a fuel cell according to an embodiment of the present disclosure.

FIG. 2 illustrates a catalyst electrode forming a fuel cell according to an embodiment of the present disclosure. Also, FIG. 3A and FIG. 3B illustrate a process for forming the fuel cell and a second electrode portion according to an embodiment of the present disclosure.

Figure 3A:
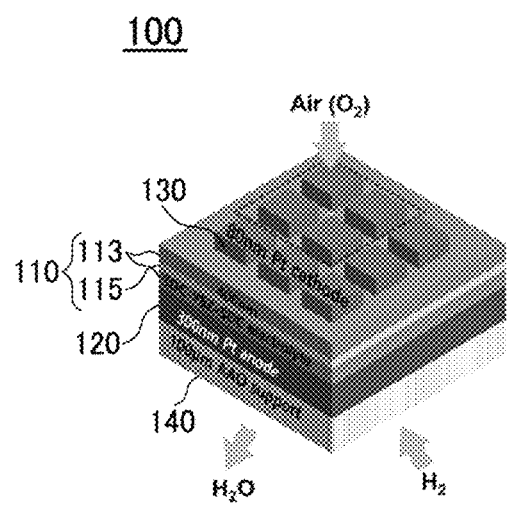
FIG. 3A and FIG. 3B illustrate a process for forming the fuel cell and a second electrode portion according to an embodiment of the present disclosure.
Figure 3B:
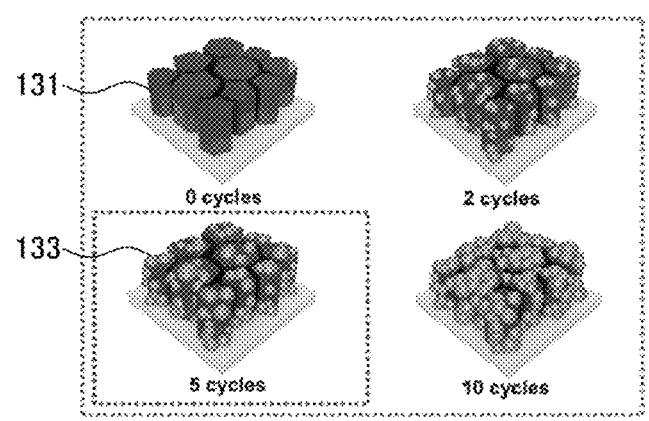

Referring to FIG. 2, FIG. 3A and FIG. 3B, a fuel cell 100 according to an embodiment of the present disclosure may include an electrolyte layer 110, a base electrode 120 formed on one side of the electrolyte layer 110, and a catalyst electrode 130 formed on the other side of the electrolyte layer 110 to be apart from the base electrode 120 with the electrolyte layer 110 interposed therebetween.

In the fuel cell 100 according to an embodiment of the present disclosure, the base electrode 120 may function as an oxidation electrode (anode) that reacts with hydrogen which is fuel and the catalyst electrode 130 may function as a reduction electrode (cathode) that reacts with air (oxygen).

The electrolyte layer 110 may be formed to be in contact with each of the base electrode 120 and the catalyst electrode 130 and provided as a travel path of ions. To be specific, the electrolyte layer 110 may include first electrolyte layers 113 that contains samaria-doped ceria (SDC) and a second electrolyte layer 115 that is positioned between the first electrolyte layers 113 to be apart from each of the base electrode 120 and the catalyst electrode 130 and contains yttria-stabilized zirconia (YSZ).

Referring to FIG. 3A, the fuel cell 100 according to an embodiment of the present disclosure may further include a supporting layer 140 to support the base electrode 120 from the other side of the electrolyte layer 110. Also, the first electrolyte layers 113 may be formed as a pair of samaria-doped ceria (SDC) stacked bodies and arranged to be in contact with each of the base electrode 120 and the catalyst electrode 130. Further, the second electrolyte layer 115 may be formed of yttria-stabilized zirconia (YSZ) and arranged between the pair of first electrolyte layers 113. That is, the electrolyte layer 110 may have a sandwich structure in which the second electrolyte layer 115 is interposed between the first electrolyte layers 113.

Meanwhile, the catalyst electrode 130 according to an embodiment of the present disclosure may include a first electrode portion 131 that covers a part of the electrolyte layer 110 and a second electrode portion 133 that covers a part of a surface of the first electrode portion 131 to form an electrode portion interface in contact with the first electrode portion 131.

Herein, the catalyst electrode 130 may be located on a supporting member and configured to promote an electrochemical reaction, and in this case, the supporting member may be the electrolyte layer 110 or the supporting layer 140.

For example, the first electrode portion 131 may include a plurality of electrode columns protruding from the surface of the electrolyte layer 110, and the second electrode portion 133 may be formed to partially cover top surfaces and side surfaces of the electrode columns.

Herein, the first electrode portion 131 may contain platinum (Pt) and the second electrode portion 133 may contain a cerium (Ce) oxide (e.g., $CeO_2$). That is, the fuel cell 100 according to an embodiment of the present disclosure may be formed by depositing the first electrode portion 131 formed of Pt on one side of the electrolyte layer 110 through a wet process or an E-beam process.

In the fuel cell 100 according to an embodiment of the present disclosure, the first electrode portion 131 containing Pt and the second electrode portion 133 containing a Ce oxide are in contact with each other to form an electrode portion interface (e.g., Pt—Ce interface), and, thus, the catalytic reactivity of Pt can be improved and the amount of a reaction intermediate formed on the surface of Pt during a reaction at an air electrode (oxygen reduction reaction (ORR)) can be regulated. Therefore, the catalytic reactivity per unit area of the first electrode portion 131 can be improved.

Meanwhile, the second electrode portion 133 according to an embodiment of the present disclosure may cover the surface of the first electrode portion 131 by atomic layer deposition (ALD).

Herein, the deposition thickness of the second electrode portion 133 may be controlled to about 2 nm. Therefore, the exposed surface of the first electrode portion 131 is not entirely covered and an electrode portion interface which is a Pt—Ce interface between Pt and Ce oxide can be formed.

Meanwhile, the second electrode portion 133 may cover the first electrode portion 131 and anchor the first electrode portion 131 to the electrolyte layer 110. In this case, the ALD is based on a chemical reaction between the electrolyte layer 110 and the first electrode portion 131, and, thus, the bonding force between the electrolyte layer 110 and the first electrode portion 131 can be improved.

To be specific, the second electrode portion 133 covers the first electrode portion 131 and may cover at least a part of a relatively thermodynamically unstable area in the surface of the first electrode portion 131, and, thus, the thermal stability of the first electrode portion 131 containing Pt can be improved.

Also, the second electrode portion 133 may promote the adsorption of oxygen molecules, or the oxygen molecules may promote the diffusion of dissociated O adatoms or modify the electronic structure of the first electrode portion 131, or the dissociated O adatoms may promote the bonding of reduced oxygen ions to the electrolyte layer 110.

Meanwhile, the second electrode portion 133 may be formed to a thickness of from about 2 nm to about 5 nm on the surface of the first electrode portion 131, but may not be limited thereto. For example, referring to FIG. 3B, the thickness of the second electrode portion 133 may be controlled by the growth rate per cycle (GPC), and the GPC may vary depending on the kind of a precursor and the deposition temperature.

That is, the thickness of the second electrode portion 133 and an area of the electrode portion interface may be controlled by a number of depositions by ALD. The electrochemical performance of the second electrode portion 133 may be changed depending on the thickness thereof. This will be described in more detail below with reference to FIG. 5.

Figure 4:
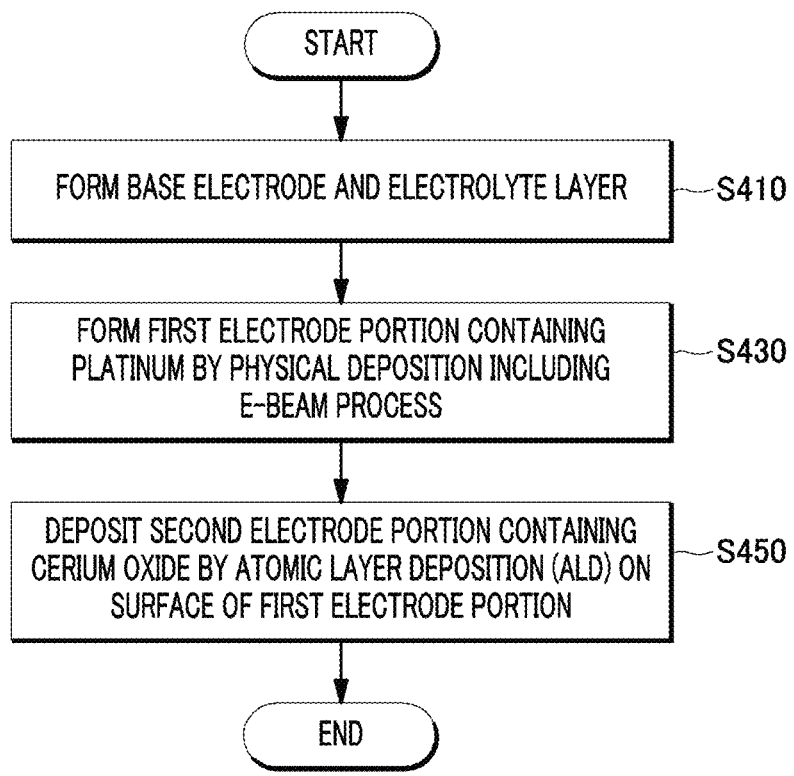
FIG. 4 illustrates a fuel cell manufacturing method according to an embodiment of the present disclosure.

Hereinafter, a fuel cell manufacturing method according to an embodiment of the present disclosure will be described with reference to FIG. 4. FIG. 4 illustrates the fuel cell manufacturing method according to an embodiment of the present disclosure.

Referring to FIG. 4, in process S410, the base electrode 120 and the electrolyte layer 110 may be formed.

In process S430, the first electrode portion 131 covering a part of the electrolyte layer 110 may be formed by physical deposition including an E-beam process.

In process S450, the second electrode portion 133 containing a Ce oxide may be deposited by ALD on the surface of the first electrode portion 131.

That is, the fuel cell 100 according to an embodiment of the present disclosure may be formed by forming the electrolyte layer 110, forming the first electrode portion 131 on a part of the electrolyte layer 110, and depositing the second electrode portion 133 on the surface of the first electrode portion 131.

In the descriptions above, processes S410 to S450 may be divided into additional processes or combined into fewer processes depending on an embodiment of the present disclosure. In addition, some of the processes may be omitted and the sequence of the processes may be changed if necessary.

Figure 5:
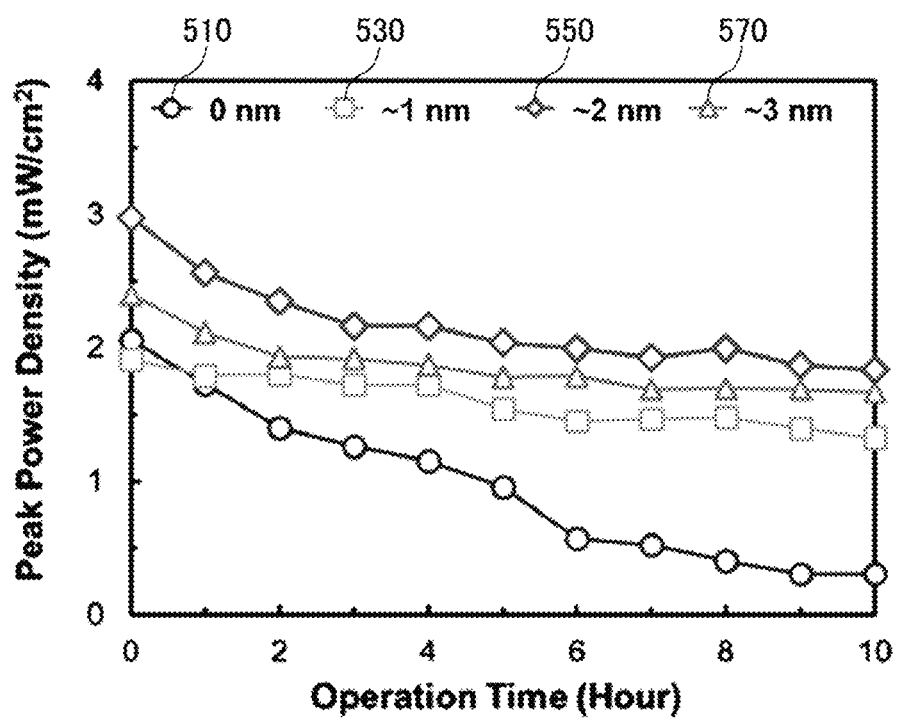
FIG. 5 shows the electrochemical performance depending on a thickness of the second electrode portion according to an embodiment of the present disclosure.

FIG. 5 shows the electrochemical performance depending on the thickness of the second electrode portion 133 according to an embodiment of the present disclosure.

Referring to FIG. 5, the electrochemical performance of the second electrode portion 133 may be changed depending on the thickness thereof. To be more specific, the second electrode portion 133 may exhibit different electrochemical performance with a first thickness 510, a second thickness 530, a third thickness 550 and a fourth thickness 570. As the thickness increases gradually from the first thickness 510 to the fourth thickness 570, the area of the surface of the first electrode portion 131 covered by the second electrode portion 133 may increase, i.e., the area of the electrode portion interface may increase. As illustrated in the drawing, it can be seen that when the second electrode portion 133 has a thickness of about 2 nm on the surface of the first electrode portion 131, the electrochemical performance of the fuel cell 100 according to an embodiment of the present disclosure is improved. Desirably, the second electrode portion 133 may have a thickness of from about 2 nm to about 5 nm or from about 2 nm to about 3 nm on the surface of the first electrode portion 131 while covering a part of the surface of the first electrode portion 131.

Since the thickness of the second electrode portion 133 is controlled by the GPC, the electrochemical performance of the second electrode portion 133 may be changed.

Figure 6A:
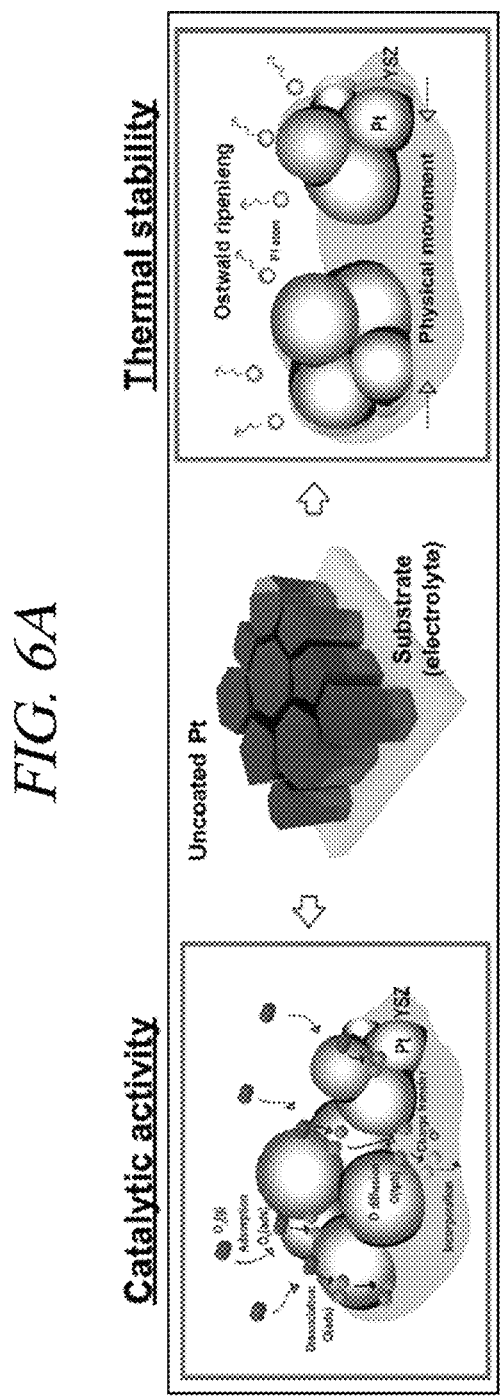
FIG. 6A and FIG. 6B illustrate the mechanism of the functional effects of the catalyst electrode and the second electrode portion of the fuel cell according to an embodiment of the present disclosure.
Figure 6B:
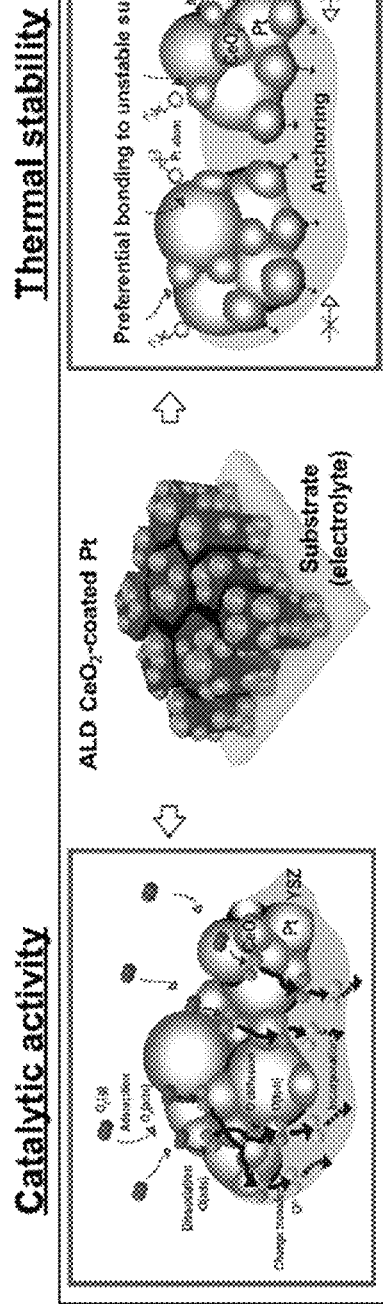

FIG. 6A and FIG. 6B illustrate the mechanism of the functional effects of the catalyst electrode and the second electrode portion of the fuel cell according to an embodiment of the present disclosure.

To be more specific, FIG. 6A illustrates a catalyst electrode of a conventional fuel cell and FIG. 6B illustrates a catalyst electrode of a fuel cell according to an embodiment of the present disclosure. For example, the catalyst electrode of the fuel cell illustrated in FIG. 6A is a Pt—C polymer and the catalyst electrode illustrated in FIG. 6B is formed by covering the first electrode portion 131 formed of Pt with the second electrode portion 133 formed of a Ce oxide.

According to comparison between FIG. 6A and FIG. 6B, in the catalyst electrode included in the fuel cell 100 according to an embodiment of the present disclosure, an electrode portion interface is formed by the second electrode portion 133, and, thus, the adsorption of oxygen molecules to the catalyst electrode 130 can be promoted and the oxygen molecules can promote the diffusion of dissociated O adatoms to the interface between the first electrode portion 131 and the electrolyte layer 110. Also, the reduction of O adatoms to oxygen ions ($O^{2-}$) can be promoted by modifying the electronic structure (specifically, valence electron (5d)) of the first electrode portion 131. Further, the absorption or incorporation of the oxygen ions to the electrolyte layer 110 can be promoted.

Therefore, the fuel cell 100 according to the present disclosure can exhibit high activity with a small amount of Pt. Accordingly, the electrochemical performance of the fuel cell can be improved.

As illustrated in FIG. 6A and FIG. 6B, the second electrode portion 133 functions to anchor particles of the first electrode portion 131 to the electrolyte layer 110, and, thus, the bonding force between the electrolyte layer 110 and the first electrode portion 131 can be improved. To be specific, an ALD reaction occurs preferentially near the interface between catalyst particles and the electrolyte layer 110 where more bonding can be accommodated and free energy can be minimized. Therefore, it is possible to suppress physical movement or aggregation of particles forming the first electrode portion 131.

According to the ALD, the second electrode portion 133 is selectively bonded to a thermodynamically unstable area (e.g., edge) in the surface of the first electrode portion 131, and, thus, it is possible to suppress Ostwald ripening the particles in the first electrode portion 131. Therefore, it is possible to suppress the degradation of the first electrode portion 131 and improve the thermal stability of the first electrode portion 131. Also, the stability of the catalyst electrode after the lapse of a long time and at a high temperature can be improved.

Further, in the fuel cell 100 according to the present disclosure, the first electrode portion 131 and the second electrode portion 133 of the catalyst electrode 130 can be formed separately. Therefore, a conventional process for forming the first electrode portion 131 can be used. That is, a conventional method of preparing a new material composition in the form of slurry and stacking it requires the replacement with a new manufacturing device and process, whereas the present disclosure can be implemented by performing the conventional process of preparing Pt—C(the first electrode portion 131) (processes S410 and S430) and then further performing a process of preparing the second electrode portion 133 (process S450). Therefore, according to the present disclosure, it is possible to minimize a decrease in mass-productivity or an increase in cost caused by the addition of a new material.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A fuel cell, comprising:
    an electrolyte layer;
    a base electrode formed on one side of the electrolyte layer; and
    a catalyst electrode formed on an opposite side of the electrolyte layer to be separate from the base electrode with the electrolyte layer interposed therebetween,
    wherein the catalyst electrode includes:
        a first electrode portion that contains platinum (Pt), covers a part of the electrolyte layer, and includes a plurality of electrode columns protruding from a surface of the electrolyte layer; and
        a second electrode portion that contains a cerium (Ce) oxide, partially covers a part of a surface of the first electrode portion to form an electrode portion interface in contact with the first electrode portion by only partially covering top surfaces and side surfaces of the electrode columns with Ce oxide such that catalytic reactivity of the Pt is increased at an exposed surface of the first electrode portion.

2. The fuel cell of claim 1, wherein the second electrode portion is configured to promote the adsorption of oxygen molecules, or the oxygen molecules promote the diffusion of dissociated O adatoms, or modify the electronic structure of the first electrode portion to promote the reduction of the O adatoms to oxygen ions, or the O adatoms promote the absorption or incorporation of the oxygen ions to an interface between the electrolyte layer.

3. The fuel cell of claim 1, wherein the second electrode portion anchors the first electrode portion to the electrolyte layer or is bonded to at least a part of a thermodynamically unstable area in the surface of the first electrode portion.

4. The fuel cell of claim 1, wherein the second electrode portion is formed to a thickness of from 2 nm to 5 nm on the surface of the first electrode portion.

5. The fuel cell of claim 1, wherein the electrolyte layer contains yttria-stabilized zirconia (YSZ).

6. The fuel cell of claim 1, wherein
    the base electrode further includes a supporting layer to support the base electrode from the other side of the electrolyte layer, and
    the electrolyte layer includes:
        first electrolyte layers that are formed to be in contact with each of the base electrode and the catalyst electrode and contains samaria-doped ceria (SDC); and
        a second electrolyte layer positioned between the first electrolyte layers to be apart from each of the base electrode and the catalyst electrode and contains yttria-stabilized zirconia (YSZ).

7. A fuel cell manufacturing method, comprising:
    forming a base electrode and an electrolyte layer; and
    forming a catalyst electrode on an opposite side of the electrolyte layer to be separate from the base electrode with the electrolyte layer interposed therebetween,
    wherein the forming of the catalyst layer includes:
        forming a first electrode portion that contains platinum (Pt) to cover a part of the electrolyte layer, and including a plurality of electrode columns protruding from a surface of the electrolyte layer; and
        forming a second electrode portion that contains a cerium (Ce) oxide that partially covers a part of a surface of the first electrode portion to form an electrode portion interface in contact with the first electrode portion by only partially covering top surfaces and side surfaces of the electrode columns with Ce oxide in a way such that catalytic reactivity of the Pt is increased at an exposed surface of the first electrode portion.

8. The fuel cell manufacturing method of claim 7, wherein the forming of the second electrode portion includes:
   depositing a material forming the second electrode portion by atomic layer deposition on the surface of the first electrode portion.

9. The fuel cell manufacturing method of claim 8, wherein a thickness of the second electrode portion and an area of the electrode portion interface are controlled by a number of depositions by the atomic layer deposition.

10. A catalyst electrode formed on a supporting member to promote an electrochemical reaction, comprising:
   a first electrode portion that contains platinum (Pt), covers a part of the supporting member, and includes a plurality of electrode columns protruding from a surface of an electrolyte layer; and
   a second electrode portion that contains a cerium (Ce) oxide, partially covers a part of a surface of the first electrode portion to form an electrode portion interface in contact with the first electrode portion by only partially covering top surfaces and side surfaces of the electrode columns with Ce oxide such that catalytic reactivity of the Pt is increased at an exposed surface of the first electrode portion.

11. The catalyst electrode of claim 10, wherein the second electrode portion is formed by depositing a material forming the second electrode portion by atomic layer deposition on the surface of the first electrode portion.

\* \* \* \* \*